United States Patent [19]
Rothstein et al.

[11] 3,745,831
[45] July 17, 1973

[54] DISPOSABLE THERMOMETER

[75] Inventors: Edwin C. Rothstein, Flushing; Bruce Ravdin, Merrick, both of N.Y.

[73] Assignee: Life Technology Corp., Flushing, N.Y.

[22] Filed: Aug. 5, 1971

[21] Appl. No.: 169,176

[52] U.S. Cl. ............... 73/371, 73/368.4, 141/329
[51] Int. Cl. ........................ G01k 5/10, G01k 5/22
[58] Field of Search .............. 73/371, 368.4, 368.7, 73/420; 141/329

[56] References Cited
UNITED STATES PATENTS

| | | | |
|---|---|---|---|
| 3,218,861 | 11/1965 | Moore et al. | 73/371 |
| 1,801,210 | 4/1931 | Schlaich | 73/368.4 |
| 3,487,693 | 1/1970 | Weinstein | 73/371 |
| 1,846,792 | 2/1932 | Carroll et al. | 73/368.4 |
| 3,422,679 | 1/1969 | McGowan | 73/420 X |
| 3,055,367 | 9/1962 | Thorstad | 141/329 X |
| 3,482,258 | 12/1969 | Steen | 141/329 X |
| 3,631,721 | 1/1972 | Nollen | 73/371 X |
| 3,680,385 | 8/1972 | Moran et al. | 73/368.4 |
| 3,091,365 | 5/1963 | Homer et al. | 73/368.7 |

*Primary Examiner*—Richard C. Queisser
*Assistant Examiner*—Daniel M. Yasich
*Attorney*—Dean S. Edmonds et al.

[57] ABSTRACT

A disposable thermometer including a base member having a reservoir containing a heat-sensitive indicator liquid maintained by a seal, a stem member having a capillary longitudinally disposed therein in registry with a temperature scale on its outer surface, and a rupturing means. The base member and stem member are constructed so that the seal may be broken by the rupturing means, thereby allowing the indicator liquid in the reservoir to expand into the capillary channel to register various temperatures when desired.

14 Claims, 9 Drawing Figures

PATENTED JUL 17 1973 3,745,831
SHEET 1 OF 2
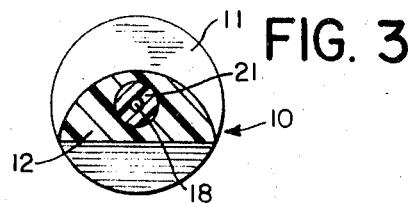
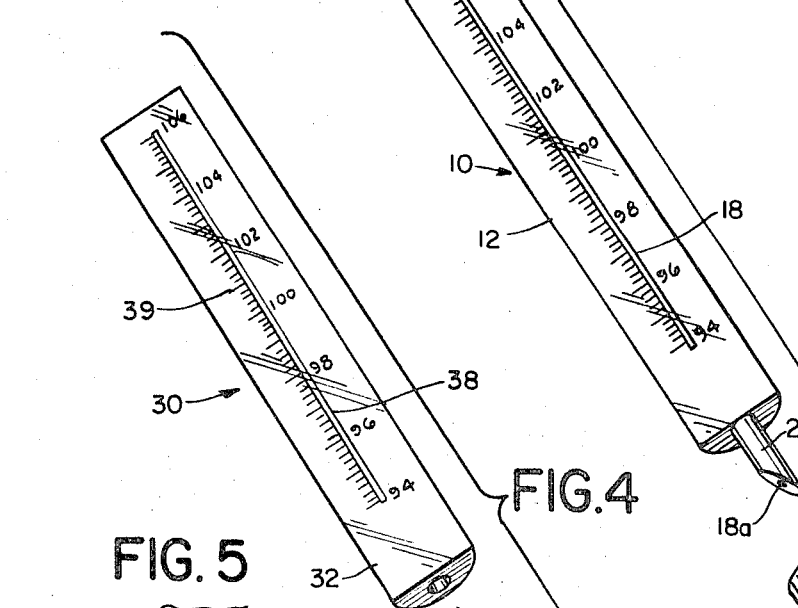
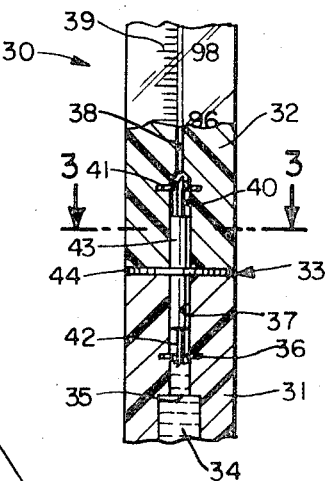
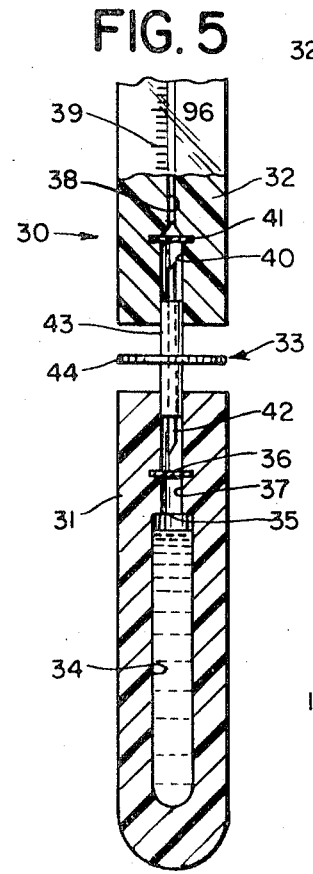
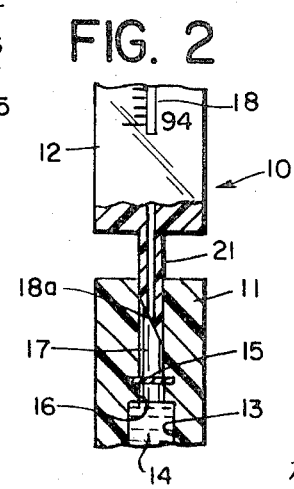
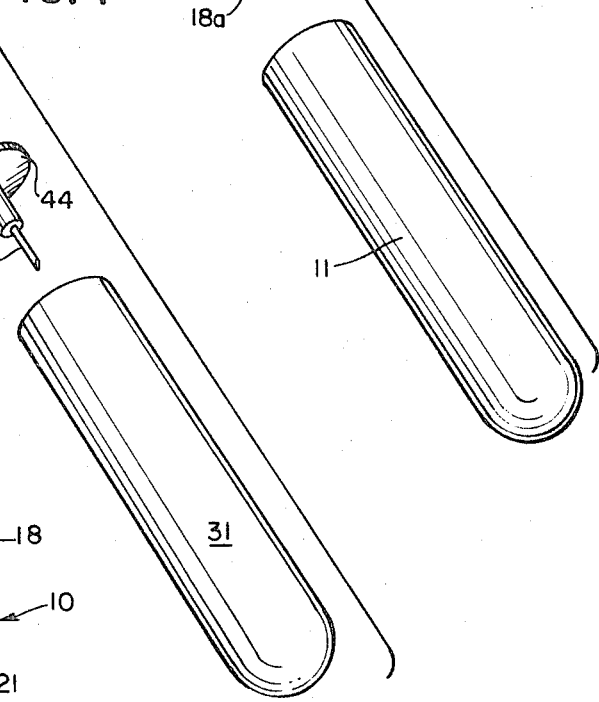
INVENTORS
BRUCE RAVDIN
EDWIN C. ROTHSTEIN
BY
Pennie, Edmonds, Morton, Taylor & Adams
ATTORNEYS

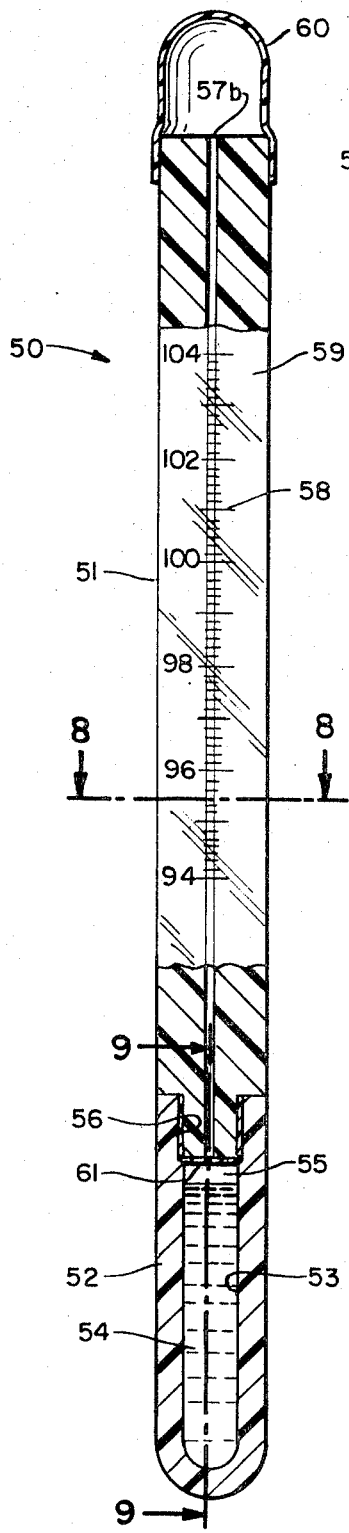
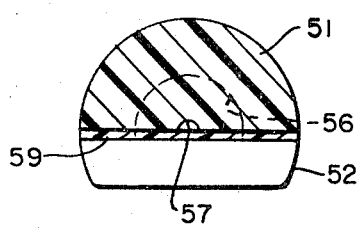
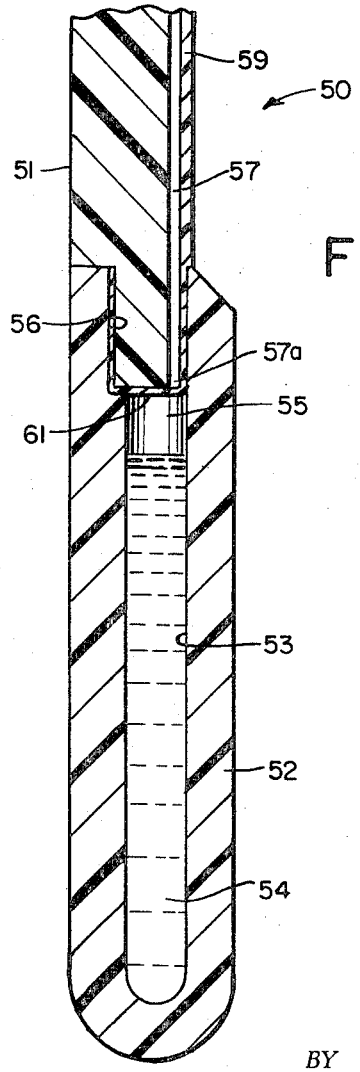

DISPOSABLE THERMOMETER

BACKGROUND OF THE INVENTION

The present invention relates to an improved heat measurement instrument which is disposable after a single use, and more particularly to a disposable clinical thermometer which will not function as a thermometer until required.

The glass mercury thermometer has long been the main temperature measuring device used to register body temperature. Although the glass mercury thermometer has found wide use, it has many accompanying disadvantages. For example, the very fact the thermometer contains mercury is a distinct disadvantage in that its use poses a threat to human life, because mercury is a poison. The glass mercury thermometer is easily breakable and necessitates great care in handling. Great care must also be taken to insure proper sterilization to prevent cross-contamination of patients or members of a household when reusing the thermometer. They are slow to register temperatures. Storage, even in home use, is difficult, and the care and recycling of them has proven a substantial economic drain on doctors and institutions, such as hospitals, clinics, etc., which in turn has added to today's high cost of medical care.

The inherent dangers and expenses entailed when utilizing glass mercury thermometers as sparked a number of efforts to develop safe, accurate and economic temperature-measuring devices which would meet clinic needs. For example, in U. S. Pat. Nos. 3,430,491 and 3,487,693, plastic has replaced glass and mercury is not used as an indicator liquid. Such structures, although meeting some of the dangers of glass mercury thermometers have created an even greater danger and disadvantage in regard to their storage and maintenance. The present disposable thermometers utilize a unitary system which is disposable after a single use and yet they provide no safeguard to prevent the registration of temperatures prior to their desired use. If either during manufacture, packaging, transportation or storage temperatures should rise above those measured for clinical use, all the thermometers being manufactured, packaged, etc. will be rendered useless. To insure against this great danger of mass spoilage and maintain the usefulness of the thermometers would necessitate large expenditures for containers and special care would have to be taken in the manufacture, packaging, etc. equal to or greater than the present care and expenditure accompanying the manufacturing, packaging etc. of glass mercury thermometers.

SUMMARY OF THE INVENTION

The present disposable thermometer includes a base member, a stem member, and a rupturing means. The base member includes an internal reservoir, a channel extending from the reservoir, and a seal. The reservoir contains a solution of heat sensitive expandable indicator liquid and a staining material which solution is maintained within the base member by the seal. The stem member is composed of a transparent tube having an internal, longitudinally extending capillary channel open at a first end and including a calibrated temperature scale on the outer surface of the tube in registry with the capillary channel. The means for rupturing the seal, which may be an integral part of the stem member or a separate entity, is utilized at the time the thermometer is to be used. The act of rupturing the seal permits the solution of indicating liquid and staining material to enter the capillary channel in the stem member to register and record permanently by action of the staining material in the solution, various temperature levels.

The present disposable thermometer is particularly useful for institutions and doctors. Accordingly, the disposable thermometer of the present invention makes available a safe and economical thermometer which does away with costly recycling, eliminates the danger of contamination, meets clinical demands and effectively eliminates the danger of mass spoilage because it will not register temperatures until it is pressed into use.

BRIEF DESCRIPTIONS OF THE DRAWINGS

FIG. 1 is a perspective view of the present disposable thermometer.

FIG. 2 is a fractionalized side view in partial section of the present disposable thermometer.

FIG. 3 is a planar view in cross section of the present disposable thermometer.

FIG. 4 is a perspective view of another embodiment of the present disposable thermometer.

FIG. 5 is a fractionalized side view in partial section of another embodiment of the present disposable thermometer as shown in FIG. 4.

FIG. 6 is a fractionalized side view in partial section of another embodiment of the present disposable thermometer as shown in FIG. 5 when the members are pressed into a unitary structure.

FIG. 7 is a side view in partial section of another embodiment of the present disposable thermometer.

FIG. 8 is a planar view in cross section of another embodiment of the present disposable thermometer as shown in FIG. 7.

FIG. 9 is a fractionalized side view in cross section of another embodiment of the present disposable thermometer as shown in FIG. 7.

DESCRIPTION OF THE PREFERRED EMBODIMENT

Referring to FIGS. 1–3 the disposable thermometer 10 comprises a base member 11, a stem member 12, and a rupturing means 21. The base member 11 having a reservoir 13 therein containing a solution of heat-sensitive expandable indicator liquid and a staining material 14. The heat sensitive expandable liquids may consist of one from the group consisting of: fatty acid esters having a three to 10 carbon chain length such as methyl propionate, methyl octonoate, Kemesters$^R$, etc.; fatty acid alcohols having a three to 10 carbon chain length; aliphatics, such as petane, hexane etc.; halogenated hydrocarbons such as methylene chloride, ethylene dichloride etc.; and glycols, such as ethylene glycol etc. The staining material may consist of any oil-soluble dye, the most effective however is "flaming red". The base member 11 may consist of one from the following group consisting of: polyethylene; polybutene; and polypropylene, all of which are compounded with conductive iron pigments or graphite in a range from about 10 percent to about 60 percent by weight or it may consist of fabricated aluminum.

The reservoir 13 in the base member 11 has an aperture 16 therein which is provided with a seal 15. The seal 15 found to be most effective is one consisting of silicone. For optimum registration of temperatures in the clinical range the indicator liquid should be sealed in a vacuum. The aperture 16 opens into an open-ended channel 17 axially disposed in the base member 11. It is to be noted the seal 15 may also be provided at any point between the aperture 16 and the end of the open-ended channel 17 in the base member.

The stem member 12 being a semi-cylindrical transparent tube consists of one of the group consisting of: polystyrene; styrene-butadiene copolymers; polycarbonates; acrylics; polymethyl pentene-1, nylon; methaacrylic-butadient-styrene; and addition-type polyesters. The stem member 12 includes a capillary channel 18 longitudinally extending therein, open at a first end 18a having a calibrated temperature scale 19 on the outer surface 20 of the stem member 12 in registry with the capillary channel 18, the open first end 18a of the capillary channel 18 forming a needle-like point 21 rupturing means. The needle-like point 21 rupturing means is movably connectable to the channel 17 in the base member 11. The base member 11 and stem member 12 during transportation or storage may be maintained separate or with the needle-like point 21 rupturing means in registry with the channel 17 in the base member above the seal 15. Whenever the thermometer is to be used, the stem member 12 is pressed together with the base member 11, the needle-like point 21 rupturing means punctures the seal 15 at the aperture of the reservoir 16 forming an airtight unit capable of registering and recording, permanently by the action of the staining material in the solution, various temperature levels.

Referring to FIGS. 4-6 is another embodiment of a disposable thermometer 30 of the present invention comprising a base member 31, a stem member 32 and a rupturing means 33.

The base member 31 includes a reservoir 34 having an aperture 35 therein which is provided with a seal 36. The aperture 35 opens into an open-ended channel 37 axially disposed in the base member 31. It is to be noted the seal 36 also may be provided at any point between the aperture 35 and the end of the open-ended channel 37 in the base member 31.

The stem member 32 is a semi-cylindrical transparent tube having an internal, longitudinally extending capillary channel 38 disposed therein having a calibrated temperature scale 39 on the outer surface of the stem member 32 in registry with the capillary channel 38 with capillary channel 38 opening into the open first end 40 of the stem member 32. A seal 41 is provided at the point where the capillary channel 38 opens into the open first end 40 of the stem member 32. It is to be noted the seal 41 may also be maintained at any point within the open first end 40 of the stem member 32.

The rupturing means 33 including a hollow needle 42 open at first and second ends axially disposed through a cylindrical cork 43 which cork 43 is axially disposed through a stopper 44. The cork 43 is movably connectable to both the channel 37 in the base member 31 and the open first end 40 of the stem member 32. This particular embodiment provides for the maintenance of a vacuum in both the sealed reservoir 34 in the base member 31 and the sealed capillary 38 in the stem member 32.

Whenever the thermometer 30 is to be used, the connecting member 33 is movably connected in the channel 37 in the base member 31 and the channel 40 in the stem member 32 such that when the base member 31 and stem member 32 are pressed together, the needle 42 in the rupturing means 33 will simultaneously puncture the seals 36, 41 in the base 31 and stem 32 members forming an airtight unit permitting the solution to enter the stem member to register and to record, permanently by action of the staining material in the solution, various temperature levels.

Referring to FIGS. 7-9 is yet another embodiment of a disposable thermometer 50 of the present invention comprising a stem member 51, a base member 52, and a rupturing means 60.

The base member 52 includes a reservoir 53 having an aperture 55 therein containing the solution of the heat-sensitive expandable indicator liquid and staining material 54. The aperture 55 opens into an open-ended channel 56 axially disposed in the base member 52.

The stem member 57 is a semi-circular transparent tube including an internal, longitudinally extended groove 57 open at first and second ends 57a, 57b of the stem member 51, the flat surface of the stem member 51 is covered with a flat piece of transparent material 59, said flat material 59 being composed of the same material which the stem member 51 is composed of and which is laminated onto the stem member 51 enclosing the groove 57 thereby forming a capillary channel. The laminate 59 is provided with a calibrated temperature scale 58 on the outer surface in registry with the capillary channel in the stem member 51. The stem member 51 also includes the rupturing means 60 which is fitted over the second end 57b of the stem member 51. The first end 57a of the stem member 51 is constructed so as to be movably connectable with the open-ended channel 56 in the base member 52. The first end 57a of the stem member 51, which is movably connected to the base member 52, is provided with a burstable seal 61, preferably composed of silicone, such that when the rupturing means 60 on the second end 57b of the stem member 51 is squeezed, the burstable seal 61 will be ruptured permitting the indicating liquid 54 to enter into the stem member to permanently register and record temperature levels.

A patient's temperature is registered quickly with the present invention, because the various solutions respond quickly to register temperatures and the staining material in solution with the heat sensitive expandable indicator liquid permanently stains the capillary channel when the solution rises in said capillary channel to register the patient's temperature, thereby providing a quick thermometer which provides an accurate and long-lasting record of the patient's temperature.

I claim:

1. A disposable thermometer comprising:
   a. a base member including an internal reservoir containing a solution, which includes a heat-sensitive expandable indicator liquid and a staining material; a channel extending from the reservoir; and a seal co-operating with said channel for maintaining the solution within the base member;
   b. a transparent elongated stem member having an internal, longitudinally extending, capillary channel open at a first end of the stem member, and including a calibrated temperature scale on its outer surface in registry with the capillary channel; and
   c. a means operable for rupturing the seal to permit entry of the solution of the indicator liquid and staining material into the open end of the capillary channel in a substantially air tight manner to register and to record, permanently, temperature levels.

2. A disposable thermometer according to claim 1, wherein the solution is maintained in the reservoir under vacuum.

3. A disposable thermometer according to claim 1, wherein the stem member comprises a transparent resinous plastic material.

4. A disposable thermometer according to claim 1 wherein the base member consists of fabricated aluminum.

5. A disposable thermometer according to claim 1, wherein the base member comprises 10 to 60 percent conductive iron pigment dispersed in a member of the group consisting of polyethylene, polybutene and polypropylene.

6. A disposable thermometer according to claim 1, wherein the base member comprises 10 to 60 percent conductive graphite pigment dispersed in a member of the group consisting of polyethylene, polybutene and polypropylene.

7. A disposable thermometer according to claim 5, wherein the pigment includes graphite.

8. A disposable thermometer according to claim 1 wherein the seal consists of silicone.

9. A disposable thermometer according to claim 1, wherein the rupturing means is secured to the stem member.

10. A disposable thermometer according to claim 1 wherein the stem member further includes a seal to close off said capillary channel.

11. A disposable thermometer according to claim 10 wherein a vacuum is maintained in the stem member.

12. A disposable thermometer according to claim 1 wherein the capillary channel is open at a second end of the stem member, the rupturing means is secured to the second end of the stem member and comprises a squeezable bulb, for increasing the air pressure within the capillary channel, to burst the seal, thereby permitting the solution to enter the capillary channel.

13. A disposable thermometer according to claim 1 wherein the elongated stem member is tubular.

14. A disposable thermometer according to claim 3 wherein the plastic material is one of polystyrene, styrene-butadiene copolymers, acrylics, polycarbonates, polymethyl pentene-1, nylon, and addition-type polyesters.

* * * * *